Patented Mar. 1, 1938

2,109,774

UNITED STATES PATENT OFFICE 2,109,774

PRINTING PROCESS

Franciscus Visser 't Hooft, Buffalo, N. Y., assignor to Lucidol Corporation, Buffalo, N. Y., a corporation of Delaware No Drawing. Application October 30, 1935, Serial No. 47,508

20 Claims. (Cl. 101—416)

The present invention relates to improvements in the printing art, and the present application is a continuation in part of my copending applications Serial No. 683,545, filed August 3, 1933, and Serial No. 716,906, filed March 22, 1934. In particular the invention relates to a method of printing which will insure rapid drying of the printed surface, and which will minimize or entirely prevent offsetting, blurring and smearing, and furthermore will produce a printed surface which is substantially scratch and rub proof, and also the present process is designed to produce if desired a printing of extremely high gloss, so much so that varnish, subsequently applied in prior practice to produce this effect when desired, may be dispensed with. The invention is applicable to printing on relatively absorbent as well as substantially non-absorbent surfaces, including relatively absorbent and substantially non-absorbent papers. The process is not limited to any particular type of printing, but may be used in a letter press, off-set press, a job press, rotary press and in processes embodying lead, copper or steel type, a printing blanket or a stone, aluminum or zinc plate.

Generally stated the invention contemplates the use in a printing process of an organic diacyl peroxide in conjunction with an oil of the Chinawood oil type, the cooperation between this combination of substances involving a rapid polymerization and oxidation of Chinawood oil under the influence of the catalytic action of the organic peroxide. In conformity with this last proposition, therefore, I use an ink in my process containing a drying oil of the Chinawood oil type. Chinawood oil and certain other oils, e. g., oiticica oil contain elaeostearin or one or more of its stereo isomers, and their drying properties are due to the auto-oxidation and polymerization of these compounds which contain a triple conjugated system

—CH=CH—CH=CH—CH=CH—

In my copending application Serial No. 683,544 I have described fully the employment of diacyl peroxides in conjunction with elaeostearin or Chinawood oil for the purpose of accelerating the auto-oxidation or polymerization of the same. Diacyl peroxides which have proved particularly suitable in my process include dilauroyl peroxide, dibenzoyl peroxide, mono-methyl-phthalyl peroxide, m m' ditoluyl peroxide and mixed fatty acid peroxides manufactured from cocoanut oil acids. I employ these diacyl peroxides to accelerate the drying of Chinawood oil in paints, inks and coating compositions generally without the necessity of using the ordinary commercial driers, such as metallic oxides, metallic soaps and the like. These diacyl peroxides can be used as ingredients in regular stock inks containing China- wood oil, but their action on the elaeostearin is so pronounced that, under ordinary storage conditions even after a short time, "skinning" and "livering" of the inks caused by premature oxidation occurs. Certain inhibitors may counteract this effect of the diacyl peroxides, but usually the inhibitors react chemically with the diacyl peroxides, thereby slowly converting the peroxides into non-accelerators and the useful effect of the peroxides is thereby lost.

I have discovered methods of taking advantage of the power of accelerating the drying of inks exhibited by the diacyl peroxides to obtain practically instantaneous solidification of the ink on the paper in high speed printing processes using two, three, four or more colors, thus avoiding waste of valuable time for drying, and eliminating danger of offsetting, without the necessity of using special covering on the cylinders of the printing mechanism and without necessitating the use of smut sheets or the like.

The process can also be used for low speed and single impression printing. The present process is applicable to offset printing, plate printing, block printing, type printing, printing from electrotypes, intaglio printing, cut printing, engraving printing, etc.

A basic feature of my invention resides in the fact that I bring together at the moment of printing, or immediately thereafter, on the paper or other surface to be printed, an ink containing Chinawood oil or elaeostearin, and an auto-oxidation-polymerization catalyst in the form of diacyl peroxide. In cases where this is desired, subjecting the wet impressions to heat and/or light of suitable wave length has a further accelerating effect on the drying rate.

In cases where the maximum acceleration of drying is not needed, or where impressions are light, or the job does not have to be handled immediately, or where the printing does not usually give serious offset troubles, the additional influence of heat and/or light of suitable wave length, may not be necessary.

The results of the present invention are secured by the joint use of some of the following, a coating composition, an ink, a method of printing, a treated paper, a spraying of the freshly inked impression, all of which necessitate the use of an ink containing Chinawood oil or elaeostearin.

The following modifications of my invention will more clearly describe the nature and scope thereof.

Example I

A special printing paper is prepared by tub sizing with a size containing a diacyl peroxide. Such a tub size is prepared e. g., by adding 500 pounds of feculose to 200–300 gallons of water and stirring until a smooth cream is obtained.

The mass is then heated to boiling by steam injection and held at this temperature for one-half hour. Cold water is added to bring the temperature to 125° F., and 250 pounds of finely powdered m m' dinitrodibenzoyl peroxide added. The fineness and even division of the diacyl peroxide near the printing surface is very important for the peroxide efficiency of the printing paper. The suspension is stirred and diluted with water until the density is 3° Bé. Such size is used in the usual size tub to produce a sized printing paper carrying about 15 to 250 m. g. of the peroxide per square foot of surface area (each side) of the paper. On this paper I print with stock inks containing Chinawood oil or elaeostearin and after each printing impression I may subject the printed web or sheet of paper to a short heat treatment such as can be obtained by leading the web or sheet over one or two hot rolls with a temperature of 200°–400° F., or through a gas flame or under an electric heater by means well known to the art. This heat treatment may be replaced or augmented by a short treatment, for example with ultra-violet light or with strong light from ordinary electric bulbs. The combined action of the diacyl peroxides penetrating the ink from the paper, and the heat or light, produces a practically instantaneous drying effect and prevents offsetting.

Three or four colored printings from different printing surfaces can be made on the paper treated as above and with different colored stock inks, all containing Chinawood oil or elaeostearin, on the same paper, which printings may overlap to any desired extent. The diacyl peroxide present in or on the original paper has usually sufficient drying power to penetrate successive layers of colored inks printed on said paper. After each printing impression a heat treatment and/or a light treatment may or may not be given. If desired, extra amounts of diacyl peroxide can be sprayed on between printings as described in Example VIII. A paper suitable for printing in the above manner may also be prepared by engine sizing, in the well known manner with a similar size containing diacyl peroxide.

Example II

A paper with a substantially non-absorbent printing surface suitable for obtaining quick drying glossy prints by the use of the process described and without subsequent varnishing, can be made as follows.

A casein solution is prepared by stirring 100 pounds of casein with 550 pounds of water until the casein is thoroughly wet. 9 pounds of soda ash and one gallon of 26% ammonia are added. The materials are stirred continuously until the casein is cut completely. A clay slip is prepared by stirring together 200 pounds of china clay, 100 pounds of water and five ounces of silicate of soda. A coating mixture is prepared by mixing 100 pounds of the above mentioned casein solution and 150 pounds of the above mentioned clay slip and stirring this mixture until a uniform suspension of the clay results. This coating mixture is then applied to a paper web so as to give a medium weight coat by one of the usual methods of coating used in the industry. After drying and rerolling and if desired calendering, the single coated paper is coated on the same side of the web with a second surface coating as follows:

A surface coating mixture for this surface coat is prepared by mixing 100 pounds of the above casein solution, 125 pounds of water and 1–4 pounds of benzoyl peroxide in the form of a finely ground watery paste. This surface coating mixture is then applied to the coated surface of the single coated paper described above so as to give a light surface coat containing from 10–100 milligrams of benzoyl peroxide per square foot of coated surface, by one of the usual methods of coating used in the industry. This double coated paper is dried and finished in the usual manner. It contains the auto-oxidation and polymerization catalyst in a finely divided form readily available in or near the top surface of a substantially non-absorbent paper.

Example III

Another paper with a substantially non-absorbent printing surface suitable for obtaining quick drying glossy prints by the use of the process described, and without subsequent varnishing can be made as follows.

A casein solution is prepared by stirring 100 pounds of casein with 550 pounds of water until the casein is thoroughly wet. Then 2½ gallons of 26% ammonia are added and the mixture stirred continuously until all the casein is dissolved. A clay slip is prepared by mixing 200 pounds of china clay, 100 pounds of water and 5 ounces of carbonate of soda and stirring until a smooth cream results. A coating mixture is prepared by mixing together 100 pounds of the above casein solution, 75 pounds of the above clay slip, 50 pounds of water and 1–4 pounds of finely divided acetyl benzoyl peroxide. These materials are stirred until a uniform suspension is obtained. This coating mixture is applied to a paper web so as to give a medium or heavy weight coating containing 10–100 milligrams of acetyl benzoyl peroxide per square foot of coated surface by one of the usual types of paper coating machines. The paper is dried and finished in the usual manner. It contains the catalyst in a finely divided form in the coating of a substantially non-absorbent paper.

Example IV

A third example of a paper with a substantially non-absorbent printing surface suitable for obtaining quick drying glossy prints by the use of the process described and without subsequent varnishing can be made as follows.

A casein solution is prepared by soaking 100 pounds of casein in 540 pounds of water for one hour. Then 5 pounds of borax are added and 6.4 pounds of trisodium phosphate. The mixture is stirred while it is heated to 150° F. Two gallons of ammonia are then added and the casein solution is cooled to 80° F. A coating color is prepared by mixing together 100 pounds of casein solution, 150 pounds of water and 1–4 pounds of a finely divided diacyl peroxide. This coating color is then sprayed in a thin uniform coat on a web of paper so as to give a light weight coat containing from 10–100 milligrams of diacyl peroxide per square foot of coated surface. The paper web may, if desired, have been coated previously with a starch-clay or other coat. The coated web is then dried and finished in the usual manner. This paper will have a more or less substantially non-absorbent printing surface containing the catalyst readily available in a finely divided form.

It should be understood that various other ingredients and procedures for the preparation of papers with substantially non-absorbent printing surfaces can be used without departing from the essence of this invention. Starch, glue, rosin, etc., may replace casein in some cases and other usual coating materials can sometimes be substituted for clay as is well known in the paper making art.

Two-sided substantially non-absorbent coated papers can be produced by any one of the above methods, either by repeating the above described operations or by applying the various coats or sprays on machines suitable for two-sided coating.

One sided substantially non-absorbent coated papers (I of course mean that the coated surface meant for printing is substantially non-absorbent, the back of the sheet which is not coated, may be absorbent), made by the above methods are especially suited for printing with inks containing elaeostearin to produce labels, etc., with a highly glossy finish without a varnishing.

Two sided substantially non-absorbent coated papers made by the above methods are especially suited for printing with inks containing elaeostearin to produce magazine covers, inserts, etc., with a highly glossy finish without the use of varnishing.

These papers when printed by the present process can be run on ordinary commercial presses at usual press speeds without giving off-set or smudging troubles. As explained in my previous applications, it is often desirable to have some heat or light application immediately after the printing to further speed up the catalytic drying of the inks.

Example V

A special printing paper suitable for high speed printing, without danger of offsetting, with Chinawood oil base inks, may be prepared by leading a web or sheet of ordinary printing paper through an impregnating bath containing a solution of 18 pounds of pp' ditoluyl peroxide in 100 gallons of chloroform. The chloroform is evaporated and the diacyl peroxide thereby evenly deposited on the web or sheet of paper in the amount of 0.1 to 1% by weight. This paper is then used in a printing process as described in Example I.

Example VI

A special coated paper suitable for printing by the process described in this case can be prepared as follows. A casein solution is prepared by mixing in a suitable vessel 82 pounds of water and 16 pounds of casein. After mixing and heating to 130° F., 2.5 pounds of soda ash are added and stirring is continued until the casein is dissolved. After cooling to room temperature 62.5 pounds of water and a finely divided mixture of 83 pounds of china clay and 4½ pounds of dibenzoyl peroxide are added, and the mixture stirred until a uniform suspension is obtained. With this coating mixture or color, paper is now coated with the usual machinery used for the manufacture of coated paper.

It will be understood that various other coating compositions known in the art can be used instead of the casein preparation mentioned in this example, e. g. compositions with starch, glue, resin, lacquer, etc., all containing diacyl peroxide.

An additional advantage of using diacyl peroxides in paper sizing or coating as described in Examples I and VI, is the fact that the diacyl peroxides have a preserving action on the sizing solutions and coating colors and prevent or retard the usual obnoxious putrefaction of these materials. So by the use of diacyl peroxides the usual bad odors in the coating room can be eliminated. I found, e. g., that a casein color made according to Example VI was still sweet and had not putrefied after three weeks, while similar coating colors without diacyl peroxides showed strong putrefaction after a few days.

Example VII

A substantially colorless transparent and preferably non-pigmented paste or ink is produced by mixing and grinding diacyl peroxides with suitable vehicles such as linseed oil which preferably has been bodied to some extent. Such vehicle can be any of a number of other substances such as refined white mineral oil, but should be substantially non-reactive with the diacyl peroxide at ordinary storage temperature and at the temperature to be used in the process, thereby producing a paste or ink of suitable consistency for printing and stable under ordinary storage conditions. Other ingredients may be added to this ink or paste if desired, but to obtain the best results in the subsequent printing process a substantially colorless, transparent or nearly white paste or ink is most desirable. I shall call this paste or ink the "diacyl peroxide paste".

An example of such a "diacyl peroxide paste" is made as follows: 89 pounds of m m' dinitrodibenzoyl peroxide are mixed with 50 gallons of bodied linseed oil and ground to a fine paste. A cobalt drier may be added to this paste if desired, in such proportions as to give 0.1 gram of cobalt per gallon of oil.

The first printing operation in a multi-color printing process using this modification of my invention is an impression with diacyl peroxide paste on ordinary paper from a master plate which should cover only those areas which subsequently will be covered by any impressions made by the plates corresponding to the several colored impressions. In place of this master plate or a line cut giving all details, a blank plate can be used covering more than the areas subsequently to be printed on. This latter method of course is less economical as far as the amount of diacyl peroxide paste used is concerned, but it makes it unnecessary for the printer to provide a master plate or line cut.

The first printing operation with the "diacyl peroxide paste" may, if desired, be followed by a superficial drying through heat application and then immediately the printed web or sheet is ready to take on the first color. The ink used for the first colored impression has a China-wood oil or elaeostearin base to which other oils and other ingredients can be added. The action of the diacyl peroxide paste on this ink may be further accelerated by the passage of the printed web or sheet over one or two heated rolls, through gas flames or electric heaters, resulting in a practically instantaneous drying of the first color on the paper. The heat treatment may be replaced or augmented by a short treatment with light of suitable wave length. The printed web or sheet is now ready for the second color printing operation. The diacyl peroxide paste has sufficiently penetrated the first colored impression so that after the second color has been printed on the web or sheet, the diacyl peroxide present can again produce a quick drying effect when the printed web or sheet with two colors is subjected to heat or ultra-violet light. In a similar way the third and fourth colors can be applied and if desired through appropriate arrangement of the mechanism the two sides of the web or sheet of paper can be printed in multi-colors without the necessity of waiting for long periods of time between printing operations and without any danger of offsetting. In many cases the heating operation or the subjection of the printed paper to ultra-violet light, may be dispensed with, e. g., in the case of four color printing with a set of four color inks of graduated tackiness in which case the colors can be printed one after the other with a heat or light treatment only after the last ink impression.

A notable feature of the present process is that the drying of the ink not only begins at the outer surface and proceeds inwardly by virtue of the action of oxygen of the air as in the ordinary printing processes, but there is also an internal drying of the ink, which apparently begins at the paper surface and proceeds outwardly. This last action produces a printing which is not only superficially dry, but dry throughout the thickness of the ink layer.

The printing process as described in this example may be reversed or modified by first printing with one or more China-wood oil inks on untreated paper followed by over-printing the printed areas with the diacyl peroxide paste and applying if desired thereafter a heat or light treatment to further accelerate the drying. In all these cases the inks and pastes should be made up with suitable graduated tackiness by means well known to the printing ink making art.

Example VIII

An eighth modification of practicing my invention is by printing on ordinary paper with inks containing China-wood oil or elaeostearin and immediately after the sheet of paper has passed the printing rolls, spraying it lightly with a solution or fine suspension of diacyl peroxides and thereafter if desired submitting the printed sheet of paper to ultra-violet light or to heat, where through the combined action of heat and diacyl peroxide a practically instantaneous drying of the ink on the paper will occur. Such a spray of diacyl peroxide solution can be applied after each successive printing.

Suitable solvents for spraying are volatile liquids which do not react strongly with the diacyl peroxides so that the solutions can be stored and do not deteriorate. These solvents include chloroform, methylene dichloride, etc.

Such a solution can be prepared as follows, e. g.: Dissolve 9½ pounds of pp' ditoluyl peroxide in 100 gallons of methylene dichloride by gently stirring at ordinary room temperature. A variation of this modification is replacing the solution or suspension by a fine dusting powder which is sprinkled over the printed impression, such dusting powder consisting e. g. of a finely powdered mixture of rosin and diacyl peroxide. This variation is suitable for the process of so-called process embossing.

The above examples have been mostly concerned with multicolor printings. It is to be understood that equivalent results may be obtained with inks in single impression printing.

The printing processes above described not only result in rapid drying of the inked surfaces, but also if desired can be used to produce a printing or inking which dries to produce a high gloss finish. This effect is obtained when free flowing smooth inks are selected which when printed according to my process dry so fast that they cannot penetrate into the paper to any substantial degree. This fast drying of a smooth ink surface gives a glossy finish to the dried impression. This effect is obtained by either the use of very fast drying inks of the China-wood oil type on more or less absorbent papers, according to my process, or by the use of such inks in combination with substantially non-absorbent papers, which further prevent penetration of the inks, as described in previous examples. The glossy printings have substantially the same gloss as a printing accomplished by the usual printing procedure, which has been subsequently varnished in a separate operation. Thus my process is adapted to produce solid inked panels (such as are often used in advertising displays) having a high glossy finish and sheen, and which require no subsequent coating with varnish to produce this effect. If a dull finish is desired, it can be obtained without the loss of drying speed by suitable selection of the paper and by suitable selection of the ink, e. g., through variation of the pigment-binder ratio of the ink or the addition of extending pigments such as, e. g., whiting.

Another feature of the present applicant's process is that the prints dry rapidly to produce printed areas which are substantially scratch and rub proof. This effect may be shown by drawing the first knuckle of the forefinger across the printed area under pressure. The foregoing test when applied to printings produced by the present applicant's process will not result in smudging, blurring or smearing. On the other hand, the same test applied to prints printed by the usual methods, (in a large percentage of the tests) caused smearing and blurring, even where the printing was known to be at least several days old, when the above test was applied to a large number of printings from various sources, including what is considered high class printing in periodicals, magazines, journals and the like.

The described printing process is not only suitable for printing on paper, but also for printing on a great number of other materials, provided the inks used contain Chinawood oil or elaeostearin or one of its stereo isomers, and provided the materials have first been printed with diacyl peroxide paste or treated with diacyl peroxides by incorporating, impregnating, coating, spraying or other means or sprayed or paste printed immediately after the ink printing with a diacyl peroxide solution or suspension or paste, or dusted with a powder containing diacyl peroxide.

Examples of such other materials include the following: "Cellophane", textiles, cardboard, wood, tinfoil, tin, china, etc. Examples of such applications are the following:

Example IX

A strip of unbleached muslin is dipped in a solution of one pound of pp' ditoluyl peroxide in one hundred pounds of chloroform and allowed to dry. A print made on this material with Chinawood oil ink dries very rapidly, while a print made on untreated cloth takes very much longer time to dry.

Example X

Tinfoil is printed with an ink containing Chinawood oil and thereafter sprayed with a solution of four pounds of dibenzoyl peroxide in one hundred pounds of acetone. After a short heat treatment the inked impression is completely dry.

*Example XI*

"Cellophane" is printed with a set of four color Chinawood oil inks of graduated tackiness. The wet impressions are overprinted with a diacyl peroxide paste of the right tackiness, such as described in Example VII, and thereafter submitted to a treatment with ultraviolet light resulting in practically instantaneous drying of the impressions.

In summing up the various modifications of my invention illustrated above, it may be said that the process contemplates the use of an ink containing a vehicle of the type of Chinawood oil varnish (oiticica oil varnish being of this same type), in conjunction with a diacyl peroxide, to produce rapid drying printed impressions. By subjecting the above wet impressions to an accompanying heat treatment, it is possible to reduce the drying time from several hours to a few seconds or minutes by the combined action of the Chinawood oil type ink, the diacyl peroxide and the heat treatment.

There have been available to printers certain coated papers which are highly non-absorbent, and heretofore in most cases it has not been practical to print on these papers because of the slow drying rate of ordinary inks on non-absorbent surfaces. By incorporating a diacyl peroxide in the surface of such paper, employing a Chinawood oil type ink and if desired a heat treatment, I have been able to produce quick drying inked impressions, even where such inkings involve heavy solid panels. An extremely high gloss is thus produced, due to the fact that there is virtually no penetration of the varnish into the body of the paper. It will be understood that this high gloss finish is obtained by my process without a subsequent varnishing of the inked impression.

It will be understood that various modifications of the above process without departing from the spirit thereof, may be made, and it is pointed out that the invention is not limited to the specific examples or to any particular process of printing, except as required by the appended claims.

By the term "elaeostearin" I mean to include all its isomeric forms.

I claim:

1. The process which comprises printing with an ink containing elaeostearin and causing said ink to dry quickly by contacting said ink with an auto-oxidation-polymerization catalyst in the form of a diacyl peroxide.

2. The process which comprises printing with an ink containing elaeostearin and then causing said ink to dry quickly by contacting it with an auto-oxidation-polymerization catalyst in the form of dibenzoyl peroxide.

3. In a printing process the improvement comprising printing with an ink containing elaeostearin on a substantially non-absorbent paper containing a diacyl peroxide in the printing surface layer thereof.

4. In a printing process, the improvement comprising printing with an ink containing elaeostearin on a substantially non-absorbent paper containing a diacyl peroxide on the surface thereof, and subjecting the inked impression to the influence of radiant energy.

5. In a printing process, the improvement comprising printing with an ink containing elaeostearin on a substantially non-absorbent paper containing a diacyl peroxide on the surface thereof, and thereafter subjecting the wet inked impression to the influence of heat.

6. A process of printing paper comprising printing with an ink containing elaeostearin on a paper carrying intimately bonded thereto, a composition containing a diacyl peroxide.

7. The process as set forth in claim 6 in which the paper is coated with a composition containing dibenzoyl peroxide.

8. A printing process adapted to produce rapid drying of wet inked surfaces which comprises printing with an ink containing elaeostearin on a surface and subjecting the wet print to the combined influence of a diacyl peroxide and heat.

9. A printing process adapted to produce rapid drying of wet inked surfaces which comprises printing with an ink containing elaeostearin on a surface and subjecting the wet print to the combined influence of dibenzoyl peroxide and heat.

10. A printing process adapted to produce rapid drying of wet inked surfaces which comprises printing with an ink containing elaeostearin on a surface and subjecting the wet print to the combined influence of a diacyl peroxide, heat and light.

11. A printing process adapted to produce rapid drying of wet inked surfaces which comprises printing with an ink containing elaeostearin on a surface and subjecting the wet print to the combined influence of dibenzoyl peroxide, heat and light.

12. A printing process adapted to produce rapid drying of wet inked surfaces which comprises printing on a surface with a transparent paste containing a diacyl peroxide and then overprinting said surface with an ink containing elaeostearin.

13. A printing process adapted to produce rapid drying of wet inked surfaces which comprises printing on a surface with an ink containing elaeostearin and then spraying said surface with a solution of a diacyl peroxide.

14. The process as set forth in claim 12 in which the printed surface is subjected to the influence of heat after the printing operation.

15. The process as set forth in claim 13 in which the printed surface is subjected to the influence of heat after the spraying operation.

16. A printing process adapted to produce rapid drying of wet inked surfaces which comprises impregnating the material to be printed with a solution of a diacyl peroxide and then printing on said material with an ink containing elaeostearin.

17. The process as set forth in claim 16 in which the printed surface is subjected to the influence of heat after the printing operation.

18. A multi-impression printing process adapted to produce rapid drying consisting of a plurality of successive inkings on the same surface which comprises printing an impression on said surface with a colorless paste containing a diacyl peroxide and over-printing said impression in a series of separate printings with inks containing elaeostearin.

19. The process as set forth in claim 18 in which after each of the several printings with the various inks, the wet inked surface is sprayed with a solution of a diacyl peroxide.

20. The process as set forth in claim 18 in which the printed surface is subjected to the influence of heat after the last printing operation.

FRANCISCUS VISSER 'T HOOFT.